July 12, 1932. P. P. HUBER 1,867,508
TRANSMISSION MECHANISM FOR AXLE DRIVEN INDICATORS
Filed April 3, 1930 3 Sheets-Sheet 1
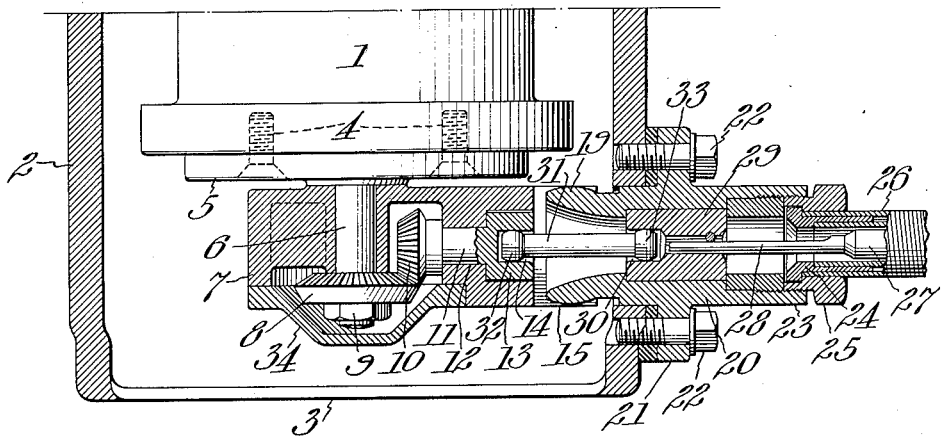
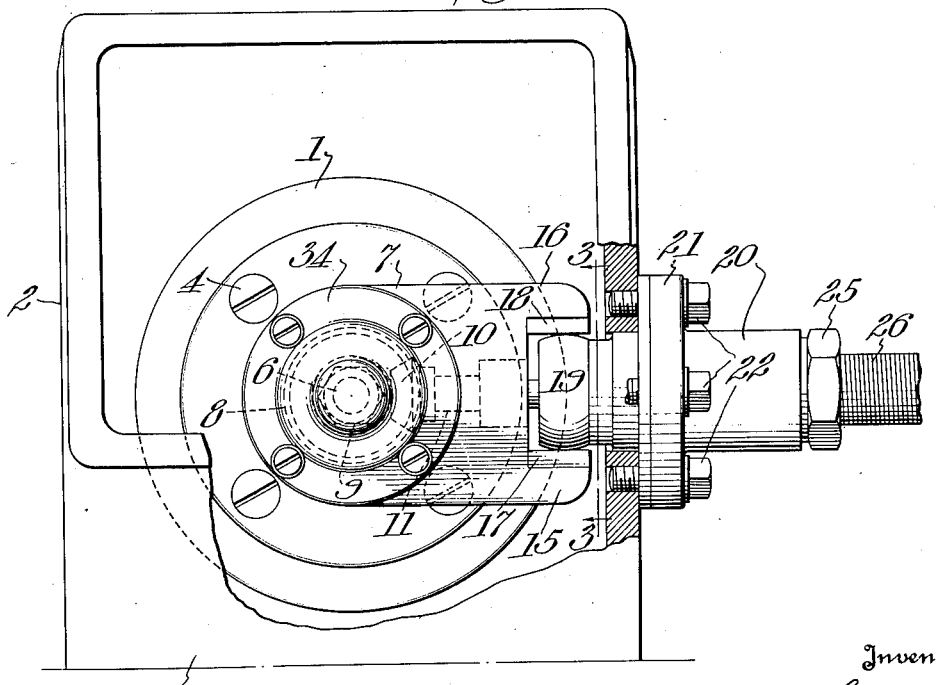
Inventor:
Paul P. Huber,
By Byrnes, Townsend & Potter,
Attorneys

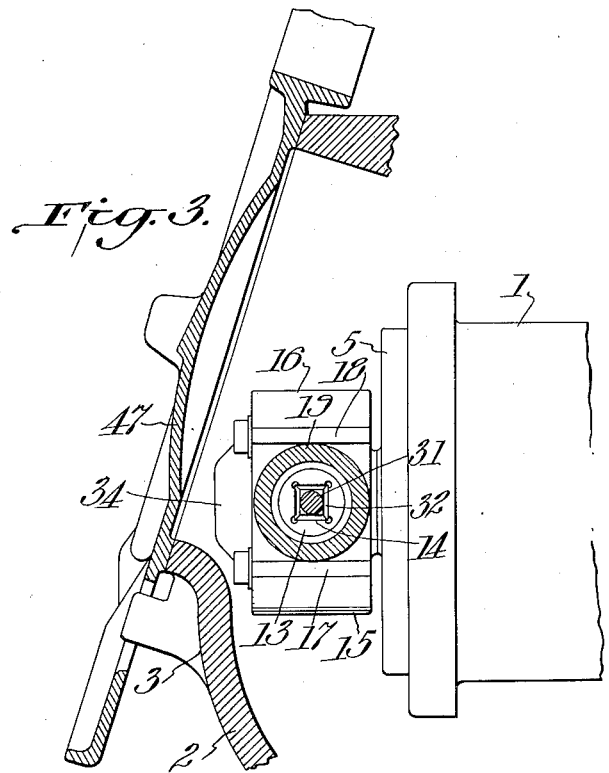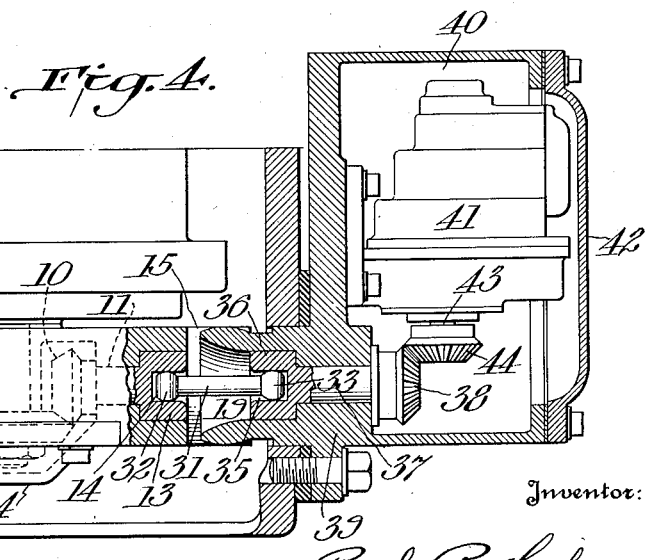

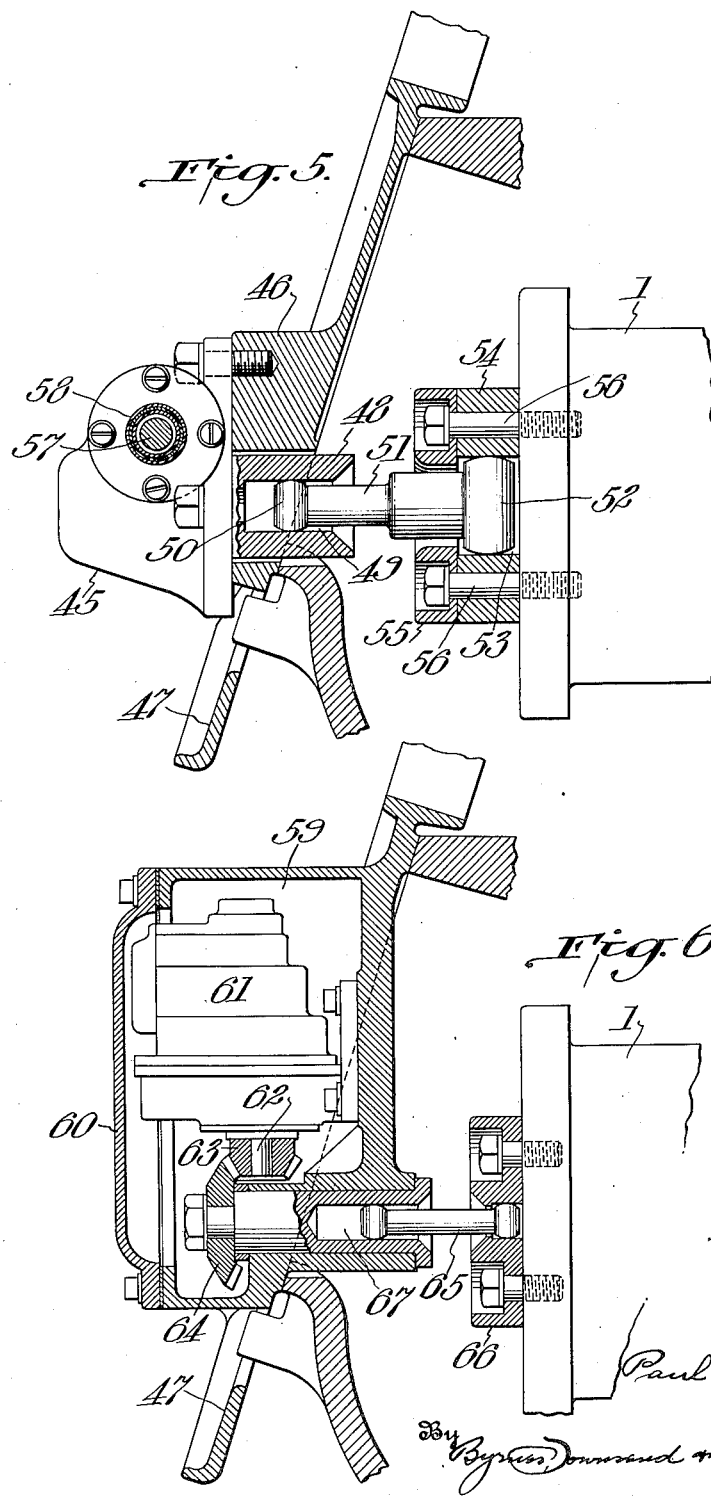

Patented July 12, 1932

1,867,508

UNITED STATES PATENT OFFICE

PAUL P. HUBER, OF HILLSIDE, NEW JERSEY, ASSIGNOR TO WESTON ELECTRICAL INSTRUMENT CORPORATION, OF NEWARK, NEW JERSEY, A CORPORATION OF NEW JERSEY

TRANSMISSION MECHANISM FOR AXLE DRIVEN INDICATORS

Application filed April 3, 1930. Serial No. 441,397.

In driving indicating devices, such as train-control mechanisms, speed indicators and the like from the axles, usually the tender or trailer truck axles, of steam locomotives, little difficulty is encountered in the provision of suitable, efficient transmission mechanism for such driving due to the fact that the ends of the axles of such trucks are flush, or substantially flush, with the outer, exposed faces of the wheels carried thereby, and the bearings are between the wheels. This makes it possible to attach any desired type of mechanism directly to the exposed outer end of such an axle free of interference with other parts.

However, in electric locomotives, the axles are similar to those used in ordinary freight and passenger cars and have their bearings in axle-boxes arranged outside of the outer faces of the wheels, these boxes being stuffed or packed with oily waste and having hinged covers whereby access may be had to their interiors, for inspection, oiling, repairs, etc. It must be remembered, moreover, that the axles have a limited movement vertically, horizontally and axially relatively to their axle-boxes. Thus, any transmission mechanism whereby driving motion is to be secured from such an axle must have such characteristics that it provides for this relative movement between the axle and axle-box and furnishes a protection for its parts of such a nature that injury of same may not occur when the axle-box is packed or repacked with waste or otherwise roughly handled by unskilled mechanics.

An object of this invention is to provide a transmission mechanism for axle driven indicators for electric locomotives and the like, wherein all of the above problems are solved and other problems anticipated, as will hereinafter appear.

The invention contemplates a transmission mechanism of the character referred to, in which a driving member is secured in driving engagement with the end of an axle terminating within an axle-box and to which it is relatively movable, this driving member being connected, in a manner to provide a universal joint, with a driven member mounted upon or carried by the axle-box. And the invention contemplates, further, various details of construction and arrangements of parts, all as will be hereinafter more particularly explained and finally claimed.

In the accompanying drawings illustrating the invention, in the several figures of which like parts are similarly designated, Fig. 1 is a horizontal sectional elevation of a portion of an axle and axle-box with one form of transmission mechanism embodying the invention applied thereto.

Fig. 2 is a front view of the parts shown in Fig. 1, parts of the axle-box being broken away and the cover thereof removed.

Fig. 3 is a section taken substantially on the line 3—3 of Fig. 2 with the cover of the axle box in place.

Fig. 4 is a view similar to Fig. 1 but showing the magneto of the indicating device carried directly by the axle-box.

Fig. 5 is an axial sectional elevation showing a modified embodiment of the invention in which the driven member of the transmission mechanism is mounted upon and movable with the hinged cover or lid of the axle-box.

Fig. 6 is a view similar to Fig. 5 but showing the magneto carried by the cover or lid of the axle-box.

Referring to the form of the invention illustrated in Figs. 1 to 3, it will be seen that the axle 1 extends into the axle-box 2 but terminates short of the outer face 3 thereof, as is customary. The axle brasses and packing of waste have been omitted from the drawings as unnecessary to an adequate understanding of the invention. Upon the end of the axle 1 is secured, as by screws 4 or the like, a plate 5 carrying a stub shaft 6, which turns within a bearing member 7 and carries a bevel gear 8 that is fixed upon the shaft 6 by a nut 9. The bevel gear 8 meshes with a bevel pinion 10 fixed upon one end of a shaft 11 mounted in a bearing 12 in the bearing member 7 and carrying at its opposite end a head 13 provided with a squared recess 14. Axial movement of the shaft 11 in its bearing 12 is thus prevented by the pinion 10 and head 13.

The bearing member 7 is provided with a pair of jaws 15 and 16, respectively, having wear-resisting liners 17 and 18, and these jaws embrace the ball-shaped end 19 of a fixed bearing member 20 secured, as by a flange 21 and cap screws 22, to the axle-box 2. This fixed bearing member is provided with an extension 23 in which is arranged by means of a suitable union connection 24—25 a flexible sleeve 26 within which is mounted for rotation the flexible shaft 27 having a flatted extension 28 which provides a driving connection with a rotatable block 29 arranged in the bearing member 20. This rotatable block is provided at the end opposite to that in which the extension 28 is engaged with a squared recess 30 complemental to and preferably in axial alinement with the squared recess 14 of the head 13. Between the head 13 and block 29 is arranged a universal coupling link or toggle 31, having squared enlarged ends 32 and 33 provided with curved bearing faces which interengage with the squared recesses 14 and 30, respectively, and provide a driving connection between the head 13 and the block 29. A cover 34 is provided for the bearing member 7 for the purpose of enclosing the bevel gearing 8—10 and for maintaining in contact therewith a suitable lubricant, if desired.

The plate 5, or its equivalent, rigidly mounted upon the axle 1 forms a driving member, and the flexible shaft 27, or its equivalent in the other forms of the invention, forms a driven member, and between these two members is interposed rotation imparting means including the link or toggle 31 by which the axle 1 may drive any desired mechanism or device.

By this arrangement of parts it will be seen that as the axle 1 rotates, it will rotate with it the shaft 6 and bevel gear 8, and will impart rotation through bevel pinion 10 to the shaft 11 and thence through head 13, link 31 and rotatable block 29 to the flexible shaft 27. This shaft 27 may be connected at any suitable point with mechanism to be driven in accordance with the speed of rotation of the axle 1. As will be apparent from other embodiments of the invention shown, particularly those illustrated in Figs. 4 and 6, the device of the invention is adapted primarily for driving a magneto or other electrical machine the current generated by which is conducted to and indicated in desired terms of speed, rotations per minute, or the like by a suitable device, such as an electric tachometer or speed indicator.

As will be seen, particularly by reference to Figs. 1 and 2, the jaws 15 and 16 in engagement with the ball-shaped end 19 of the bearing member 20, will, regardless of the hereinbefore mentioned vertical, horizontal or axial movement of the axle 1 relatively to the axle-box 2, maintain the bearing member 7 in such relation to the fixed bearing member 20 that the link or toggle 31 is always maintained in driving engagement with the head 13 and rotatable block 29, and thus the link or toggle provides a universal connector and so long as the axle 1 is rotating will insure transmission of its rotative movement through the driving member to the driven member of the transmission mechanism.

In the embodiment illustrated in Fig. 4, instead of connecting the toggle or link 31 with a rotatable block 29, it is shown as engaging the squared opening 35 of a head 36 carried by one end of a shaft 37 at the opposite end of which is mounted a bevel pinion 38. The shaft 37 has its bearing in a member 39 secured to the axle box 2 and forming a housing 40 in which the magneto 41 may be enclosed. This housing 40 is provided with a cover 42 to protect the magneto against foreign matter and the elements. The shaft 43 of the magneto is provided with a bevel gear 44 which meshes with and is driven by the bevel gear 38.

In Fig. 5 an embodiment of the invention is shown in which gearing similar to the bevel gearing 8—10 of Fig. 1 is carried in a housing 45 mounted upon a suitable boss 46 provided upon the hinged cover 47 of the axle box 2. The shaft of the gear corresponding to the gear 8 of Fig. 1 is provided with an extension 48 having a squared interior bore 49 with which engages the squared enlarged end 50 of a toggle member 51, the other end of which is provided with a head 52 similar to the head 50 mounted in the squared aperture 53 of a block 54 carried by the axle 1 and provided with a ring-shaped cap piece 55 for preventing escape of the head 52 from the aperture 53. The cap 55 and block 54 are held in fixed driving arrangement upon the axle 1 by means of suitable cap screws 56 or the like. A flexible shaft 57 having a flexible casing or sleeve 58 similar to the shaft 27 and sleeve 26, respectively, of Fig. 1, are provided for transmitting the drive from the axle 1 to the magneto or other device to be driven.

In Fig. 6 an arrangement similar to that shown in Fig. 5 is disclosed, but instead of providing for final drive by means of a flexible shaft, such as the shaft 57, the axle box cover 47 is formed in such a manner as to provide a housing 59 having a cover 60, and in this housing is arranged the magneto 61, the shaft 62 of which is driven by means of bevel gearing 63—64 from the axle 1 by means of a toggle 65 and associated connecting block 66 and counterbored sleeve 67, similar to the parts 54 and 48 of Fig. 5.

In the embodiments of the invention shown in Figs. 5 and 6, it will be obvious that the axle box cover 47 may be raised so that a mechanic may inspect the axle bearing and perform any necessary operations with respect thereto, and may then close the cover again without in any way disturbing the transmission other than that when the cover is raised the member 48 or 67 is disengaged from the toggle 51 or 65. In this connection it will be noted that due to the particular mounting of this toggle 51 or 65 upon the end of the axle 1 it cannot, when released from its complemental member carried by the axle box cover, drop to such position that it will not automatically re-engage with its complemental member 48 or 67 upon closing of the axle box cover.

In all of the embodiments of the invention illustrated it is apparent that the mounting of the links or toggles is such that under normal conditions of service they cannot become disengaged from their complemental members or sockets while in driving position.

It will be seen that the invention provides a simple transmission mechanism of the type in question which makes possible normal handling of the axle bearing, and is so constructed that the lid or cover of the axle box may be freely opened for inspection. Moreover, the mechanism is of such rugged construction as to withstand the attacks of a laborer or mechanic armed with a steel prod for redistributing the packing of oily waste, and so arranged and housed as not to become jammed or clogged by snarling up with such waste.

Furthermore, the invention makes possible the combination of a magneto or other device to be driven directly with the axle box, whereby, if desired the use of a flexible or other transmission shaft may be dispensed with and the possible failure of such a shaft in service obviated.

Various changes and modifications other than those shown and referred to are contemplated as within the spirit of the invention and the scope of the following claims:

1. In a transmission mechanism for axle driven indicators for electric locomotives and the like, the combination with an axle, and an axle box in which said axle is journalled, of a driving member secured to the end face of said axle, a driven member at the exterior of said axle box, means rotatably mounting said driven member on said axle box and restraining the same from both axial and transverse displacement with respect thereto, and drive means including telescoping elements for imparting the rotary motion of said driving member to said driven member, whereby an operative connection between said members is maintained during relative movement of said axle and axle box.

2. The invention as set forth in claim 1, wherein a wall of the axle box is provided with an opening into which a part of said drive means extends, and said mounting means and driven member close the said opening.

3. In a transmission mechanism for operating a device from the axle of an electric locomotive, the combination with an axle, and an axle box in which said axle is journalled, of driving means supported by the end of the axle and comprising a member having a non-circular socket, a driven member projecting through a wall of said axle box, journal means for said driven member secured to said axle box and restraining said driven member against axial and transverse movement, said driven member terminating in a non-circular socket at the end thereof adjacent said axle, and a driving link having non-circular heads seated in the respective sockets for transmitting the rotary motion of said axle to said driven member.

4. The invention as set forth in claim 3, wherein said driving means includes a shaft projecting from and rotated by said axle, a gear housing journalled on said shaft, a bevel gear fixed to said shaft, a stub shaft extending through a wall of said housing and carrying a gear meshing with said bevel gear, said stub shaft constituting said member having a non-circular socket, and said journal means engaging said housing to prevent rotation thereof.

5. In transmission mechanism of the type stated, the combination with an axle and an axle box having an opening in a wall thereof, of a journal member extending through said opening and secured to said wall, a driven shaft journalled in said member, a stub shaft secured to and rotating with said axle, a gear box pivoted on and enclosing said stub shaft, a connecting shaft journalled in said gear box, gears driving said connecting shaft from said stub shaft, the adjacent ends of said connecting shaft and driven shafts having non-circular sockets, and a drive link having non-circular heads seated in said sockets.

6. The invention as set forth in claim 5, wherein the end of said journal member projects within said axle box into proximity with the socketed end of said connecting shaft, the said end of said journal member including a section conforming to a spherical surface, and said gear box having opposed flanges seating against said spherical surface of said journal member.

7. In a transmission mechanism for operating a device from the end of an axle of an electric locomotive, the combination with an axle, an axle box having a cover plate, of a member fixed to the end of said axle and having a non-circular socket in alinement with the axis of the axle, a shaft journalled on said cover plate and having a non-circular socket at the end thereof adjacent said axle, a link having enlarged heads of non-circular form seated in the respective sockets, and means retaining one of said heads within its socket when said cover plate is lifted to permit access to the axle box.

8. The invention as set forth in claim 7, wherein said retaining means comprises a flange at the outer edge of the socket of the member fixed to said axle.

9. The invention as set forth in claim 7, wherein said enlarged heads have surfaces of spherical contour to permit angular displacement of the axis of said link with respect to the axes of said axle and shaft, and a flange is provided at the outer edge of said member to retain said link within the axle box when the cover plate is lifted.

10. The invention as set forth in claim 7, wherein said enlarged heads have surfaces of spherical contour to permit angular displacement of the axis of said link with respect to the axes of said axle and shaft, and a flange is provided at the outer edge of said member to retain said link within the axle box when the cover plate is lifted, said flange restricting the angular displacement of said link to such magnitude that the opposite end of said link will engage within the socket of said shaft when the cover plate is returned to normal position.

11. In a transmission mechanism for axle driven indicators, the combination with an axle box, and axle having one end thereof extending into said axle box, and a cover movable to permit access to the interior of said axle box, of means secured to the end of said axle and defining a socket of non-circular cross-section, a driven member journalled on said cover and terminating in a hollow socket of non-circular cross-section, a link member having an enlarged inner end seated within said socket-defining means, means retaining said enlarged head within said socket while permitting relative longitudinal and oscillatory movement with respect to said axle, an enlarged outer end on said link member, and means restraining said link member to such limits of oscillatory movement that said enlarged outer end is received within said hollow socket of said driven member when said axle box cover is closed.

In testimony whereof, I affix my signature.

PAUL P. HUBER.